United States Patent Office 3,551,206
Patented Dec. 29, 1970

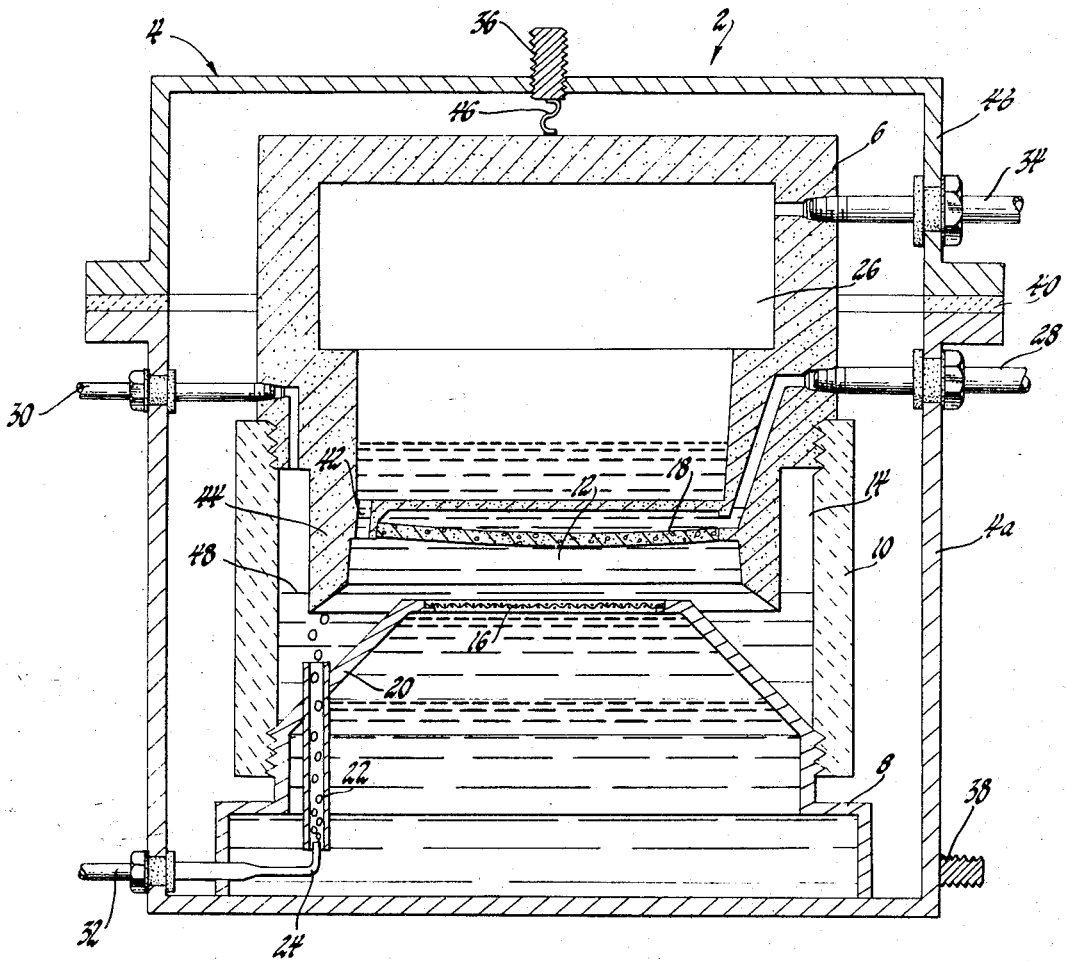

3,551,206
ELECTRICAL INSULATION IN LITHIUM-CHLORINE ELECTROCHEMICAL CELL
Phillip T. Ross, Indianapolis, Ind., assignor to General Motors Corporation, Detroit, Mich., a corporation of Delaware
Filed Dec. 20, 1968, Ser. No. 785,697
Int. Cl. H01m 27/00
U.S. Cl. 136—86                    4 Claims

ABSTRACT OF THE DISCLOSURE

A method and means for electrically insulating a lithium half-cell structure from a chlorine half-cell structure in the presence of an Li-LiCl solution. A pocket of protective gas is provided between the Li-LiCl solution and a ceramic oxide to preclude loss of the ceramic's insulator characteristics.

This invention relates generally to high temperature batteries of the lithium|lithium chloride|chlorine fused salt electrolyte type and more particularly to insulator means between the lithium half-cell structure and the chlorine half-cell structure of the cell assembly. A problem associated with lithium|lithium chloride|chlorine fused salt electrochemical cells is that of materials compatibility with the extremely chemically active and corrosive environment. This is especially true with respect to insulators. Materials which are resistant to $Cl_2$ gas, lithium chloride and molten lithium at about 700° C. are needed. Porous ceramic oxides such as alumina and beryllia are generally compatible with chlorine gas at 700° C. They are likewise chemically compatible with the Li-LiCl solution in the electrolyte region of he cell; however, these ceramic oxides are not generally compatible with the Li-LiCl solution in the electrical sense. In the presence of an Li-LiCl solution, the ceramic oxides' electrical insulator properties are greatly reduced. It has been found that in the presence of these solutions the ceramic oxides, in fact, become electrical conductors. Since no material has been found which is both chemically and electrically compatible with the Li|LiCl|$Cl_2$ cell environment, it has become necessary to devise techniques and devices for insuring adequate electrical insulation with the materials presently available. One such technique and device is disclosed herein and has for its object to provide a method and means for electrically insulating the lithium and chlorine half-cell structures, one from the other, in an otherwise unified cell assembly utilizing presently available, otherwise system incompatible, materials. The figure is a sectional, elevational view of an Li|LiCl|$Cl_2$ electrochemical cell embodying the features of this invention.

Briefly stated, this invention involves providing electrical insulation between a lithium half-cell structure and a chlorine half-cell structure which are separated by an electrolyte region defined, at least partially, by a wall containing a porous ceramic electrical insulator. The electrolyte region contains a solution of molten LiCl and dissolved lithium. Electrical insulation is accomplished by providing a protective pocket of gas in the region of the insulator to prevent contact of the insulator by the Li-LiCl solution and subsequent degradation of the insulator properties of the ceramic insulator.

The figure depicts an Li|LiCl|$Cl_2$ galvanic cell 2. The principal cell components are contained within the cell housing 4, which is made up of a bottom portion 4a and top portion 4b. The bottom and top portions 4a and 4b are electrically insulated one from the other by means of an insulator ring 40. Outside the cell components, but within the housing 4, there is maintained a pressurized atmosphere of an inert gas, such as argon. This use of an inert gas atmosphere is not considered a part of the present invention. The two principal cell components include the chlorine half-cell structure 6 and lithium half-cell structure 8. These half-cell structures are separated one from the other by means of the ring 10. The ring 10 serves to adjoin the respective half-cell portions into a unified assembly and defines an electrolyte region 12. At least a portion of the ring 10 should possess electrical insulator properties in order to preclude internal shorting of the cell.

The chlorine half-cell structure 6 is comprised principally of dense graphite or carbon which is inert to the chemical attack of chlorine as well as being electrically conductive. The half-cell structure 6 contains an electrode portion 18 which is comprised of porous carbon or graphite. Chlorine is fed from a chlorine inlet 28 to the chlorine electrode 18 through appropriate passages. A cavity 26 is provided within the chlorine half-cell structure to provide storage space for the excess lithium chloride formed during discharge of the cell. This excess lithium chloride flows through the passage 42 into the cavity or storage region 26. The half-cell structure 6 has a skirt portion 44 which depends into the electrolyte region 12. A protective gas inlet conduit 30 is provided in the chlorine half-cell structure and, through appropriate passages, communicates with the annular space 14 between the skirt 44 and ring 10. As will be discussed hereinafter, a protective gas is provided to fill the annular space 14 to keep ring 10 from losing its insulator properties. The chlorine half-cell structure 6 may be electrically connected to the top portion 4b by means of a conductor 46 or any other convenient means well within the skill of the art. An external electrical terminal 36 is provided.

The lithium half-cell structure 8 comprises preferably a stainless steel cup 20 and an electrode portion 16. The electrode portion may conveniently be comprised of stainless steel wire mesh or the like which is preferentially wettable by lithium. In this particular embodiment, the lithium half-cell structure is of the "percolator type" the operation of which is more completely described in copending U.S. patent application Ser. No. 557,954, filed June 16, 1966, in the name of Gale M. Craig, entitled "Fuel Cell Electrode" and assigned to the assignee of this invention. For purposes of a more complete description of the operation and function of this type of electrode, it is intended that the pertinent portions of the aforesaid Ser. No. 557,954 be incorporated herein by reference. Generally speaking, however, the lithium half-cell structure includes an airlift type pump which includes a lift tube 22, a gas admission tube 24 and a percolator gas inlet 32. By pumping LiCl out of the cup 20 during cell recharge a pressure differential is created across the electrode 16. On discharge, flow back through the lift tube helps keep the floating lithium in contact with the electrode 16.

The chlorine half-cell structure and lithium half-cell structure are joined one to the other by means of the insulator ring 10. In this particular embodiment, threaded connections are shown but it is, of course, intended that any convenient means for establishing these joints may be employed. An external terminal 38 is provided as a means for withdrawing current from the lithium half-cell structure.

To discharge the cell, chlorine gas is provided to the chlorine electrode 18, molten lithium to the lithium electrode 16 and the electrolyte region 12 is filled with fused lithium chloride. Next, an external circuit between the terminals 36 and 38 is closed, current begins to flow and lithium chloride produced in the region 12. The lithium chloride formed flows through the passage 42 into the storage chamber 26. So long as sufficient electrical insulation is provided between the respective half-cell structures 6 and 8, as by means of the ring 10, current will flow only through the external circuit. The ring 10 is in insulator relation to the half-cell structures, which is intended to define merely that the ring 10 at least substantially electrically insulates one half-cell from the other. Should the electrical insulation be inadequate, internal shorting of the cell results, and no useful current can be derived from the cell. It is accordingly necessary to provide and insure good electrical insulation at this portion of the assembly. The problem arises, however, that there is no known material which alone, and in and of itself, will satisfy both the electrical insulation and chemical resistance requirements at this location in the cell. The best known materials to date which are able to withstand the chemical environment and still provide a degree of electrical insulation are the high density (i.e., 95% dense) ceramic oxides, alumina and beryllia. Though normally complete insulators, these ceramic oxides become electrically conductive when exposed to solutions of Li-LiCl in electrolyte region 12 of the cell. These solutions result from dissolution of lithium into the lithium chloride electrolyte. The exact mechanism whereby the ceramic oxide is rendered conductive is not known. It is believed that some form of lithium-aluminum or lithium-beryllium conductive inter-metallic compound may be formed or in the alternative that the porous ceramic is permeated with conductive lithium metal. Regardless of the mechanism, the ductivity of the ceramic oxide increases with increased contact and exposure to the Li-LiCl solution. After extended exposure, these ceramics have, in some cases, become almost as conductive as the electrolyte itself (i.e., a resistivity of less than about 8 ohm centimeters).

Since the environment limits the selection of materials which might be used in this system, processes of operation, and cells themselves, must be devised so as to permit use of the existing, known materials, regardless of the aforesaid limitations. By this invention the normally high resistivity of the ceramic oxides is retained throughout at least a portion of the insulator ring 10. This is accomplished by depressing the Li-LiCl level in the electrolyte region 12 (e.g., to the level 48) so as to keep the Li-LiCl out of contact with at least a portion of the ring 10. This can be accomplished by pressurizing the zone 14 with a protective gas. The zone 14 between the skirt 44 and ring 10 forms a pocket of gas which keeps the electrolyte level low in the zone 14. By this technique the Li-LiCl solution is caused to contact only a portion of the ring 10, leaving a substantial portion thereof uncontacted and unwet by the solution. The uncontacted portion substantially retains its original electrical resistivity even though the portion below the solution level decreases in resistivity as a function of exposure time to the Li-LiCl solution. Inert gases may be used, but it is preferred to use chlorine gas since it is readily available and will attack neither the carbon or graphite of the skirt 44 or the ceramic oxide of the ring 10. Further, if too much chlorine is provided in the zone 14 it can bubble up under the skirt 4 and pass through the passage 42 into the storage region 26 from which it can be removed via a $Cl_2$ exhaust conduit 34. If other than chlorine (e.g., argon or other inerts) were used as the protective gas, some form of gas separation means would be required to usefully recover gases from the exhaust conduit 34. Of course, inert gases could be used, but only at the penalties indicated.

Another way of providing gas to fill the zone 14, especially in the recharge mode of the cell, is to allow the chlorine gas to be generated on the circumferential peripheral surface of the skirt 44 which faces the ring 10. Once formed in sufficient quantities and entrapped in the zone 14, the chlorine provides a pneumatic cushion, as it were, which prevents a further rise of the Li-LiCl solution into the zone 14. Further, it is not necessary that the entire ring 10 be comprised of the ceramic oxide material. Even conductive materials could be used as long as at least a portion of the wall defining the electrolyte chamber 12 is comprised of the ceramic oxide and that portion is protected by a gas pocket and in insulator relation to the two half-cell structures. A typical example of such a structure might be a considerably narrower ceramic oxide ring positioned high on the wall 10 and well within the protection offered by the pocket of gas in the zone 14.

While this invention has been described solely in terms of certain specific embodiments thereof, I do not intend to be limited thereto but rather only to the extent defined hereafter.

I claim:
1. A Li|LiCl|$Cl_2$ electrochemical cell comprising: a lithium half-cell structure; a chlorine half-cell structure; a wal joining said half-cell structures together into a unified assembly and in part defining a LiCl chamber between said half-cell structures, said wall at least in part comprising a microporous ceramic material exposed to said chamber and electrically insulating said half-cell structures one from the other; first means at least in part defining a continuous, gas-filled, LiCl-free region within said chamber adjacent a substantial portion of said material for isolating said portion from contact with LiCl and dissolved Li in said chamber to avoid conductively contaminating said ceramic material; and second means supplying gas to said region for depressing the LiCl level in said region of said chamber to maintain said region substantially LiCl-free.
2. The cell as claimed in claim 1 wherein said material is selected from the group consisting of alumina and beryllia.
3. The cell as claimed in claim 1 wherein said first means comprises an annular skirt pendant from said chlorine half-cell structure and spaced from said wall in said chamber, said region being the annular zone between the skirt and the wall.
4. The cell as claimed in claim 3 wherein said second means comprises the circumferential peripheral surface of said skirt facing said wall.

References Cited
UNITED STATES PATENTS

| 3,488,224 | 1/1970 | Craig | 136—86 |
| 3,496,023 | 2/1970 | Craig | 136—86 |

WINSTON A. DOUGLAS, Primary Examiner

HUGH A. FEELEY, Assistant Examiner